United States Patent [19]

Mahon

[11] Patent Number: 4,626,635

[45] Date of Patent: Dec. 2, 1986

[54] LATCHING PUSH BUTTON SWITCH

[75] Inventor: Joseph J. Mahon, Libertyville, Ill.

[73] Assignee: Eaton Corporation, Cleveland, Ohio

[21] Appl. No.: 696,766

[22] Filed: Jan. 31, 1985

Related U.S. Application Data

[63] Continuation-in-part of Ser. No. 490,269, May 2, 1983, Pat. No. 4,523,062.

[51] Int. Cl.[4] .............................................. H01H 43/00
[52] U.S. Cl. ............................ 200/38 A; 200/38 FA; 200/39 R
[58] Field of Search .................. 200/5 R, 5 E, 5 EA, 200/5 EB, 35 R, 38 R, 38 A, 38 F, 38 E, 39 R, 39 A, 153 J, 328; 307/141.4

[56] References Cited

U.S. PATENT DOCUMENTS

| | | | |
|---|---|---|---|
| 2,374,946 | 5/1945 | Morris | 200/39 R X |
| 2,831,075 | 4/1958 | Dumke et al. | 200/5 E X |
| 2,903,687 | 9/1959 | Baer et al. | 200/5 E X |
| 2,922,861 | 1/1960 | White | 200/153 J X |
| 3,217,188 | 11/1965 | Bauer | 200/5 E X |
| 3,367,193 | 2/1968 | Rose | 200/38 A X |
| 3,369,085 | 2/1968 | Saginario et al. | 200/38 A X |
| 3,609,491 | 9/1971 | Swanke et al. | 200/5 EB X |
| 3,770,923 | 11/1973 | Habecker | 200/153 J |
| 3,824,362 | 7/1974 | Bury | 200/153 J |

*Primary Examiner*—J. R. Scott
*Attorney, Agent, or Firm*—Fay, Sharpe, Fagan, Minnich & McKee

[57] ABSTRACT

A push button member (10) is mounted to be moved longitudinally between a first position (FIG. 1A) and a second position (FIG. 1B). The push button member includes a cam surface (16) for selectively camming an electrical contact engaging surface (18) and a hold surface (48) past a follower member (32) as the push button member is moved from the first position to the second position. In the second position, the electrical contact engaging surface urges electrical leaf spring contacts (20) into a closed conducting relationship. The spring contacts remain in the conducting relationship until a radially greater extending cam surface (52) of a timing cam (50) engages the follower member moving it to the release position. In the release position, a spring (12) biases the push button member from the second position back to the first position allowing the electrical contacts to open.

11 Claims, 5 Drawing Figures

LATCHING PUSH BUTTON SWITCH

BACKGROUND OF THE INVENTION

This application is a continuation-in-part of application No. Ser. 490,269 filed May 2, 1983, now U.S. Pat. No. 4,523,062.

The present invention relates to the art of electrical switch and latch mechanisms. It finds particular application in conjunction with electrical timing mechanisms for electrical appliances such as microwave ovens, clothes dryers, and the like. However, it is to be appreciated that the invention may find ready application in other electrical and non-electrical mechanisms such as hold and timed relays, fluidic control circuits, and the like.

Heretofore, electrical appliances such as microwave ovens and dryers commonly included a power relay. Upon setting the appropriate timers and controls, the appliances commonly required that a start button be pushed. The start button was connected in series with the power relay coil to actuate the relay causing electrical power to be supplied to the appliance. Commonly, the relay held itself actuated until an appliance timer, a safety circuit, a malfunction sensor, a door open sensor, or the like caused the power relay to release, terminating the supply of power to the appliance.

One of the drawbacks with the prior art power relays is their cost. Another drawback resides in the potential for failure and the failure associated requirement for repair or replacement.

Microwave ovens and other appliances commonly utilized microprocessors to provide a control which automatically changed operating modes at selected times. The microprocessor based controls could be set, for example, to undergo a defrost cycle for a selected duration and switch automatically to a cook cycle for another selected duration. After the cook cycle, the control could switch automatically to a keep warm cycle.

One drawback of microprocessor based controls is their initial and replacement costs. Moreover, when the microprocessor based control fails, the appliance is rendered inoperative.

The present invention provides a relatively simple electromechanical device which overcomes the above-referenced problems and others yet performs the above-discussed functions of power relays and microprocessor based controls and other similar functions.

SUMMARY OF THE INVENTION

In accordance with one aspect of the present invention, a new and improved switch is provided. A push button member is mounted for movement at least between first and second positions for selectively camming a control device between "on" and "off" states. A biasing means biases the push button member toward the first position. A hold means selectively holds the push button member in the second position against the biasing force of the biasing means. A follower member is mounted for movement at least between hold and release positions. In the release position, the follower member selectively causes the hold means to release the push button member such that the biasing means biases it back toward the first position.

In accordance with one more limited aspect of the invention, the hold means includes selectively engaging surfaces on the push button member and the follower member. Movement of the follower member to the release position moves the engaging surfaces out of engagement, allowing the biasing means to push the push button member back to the first position.

In accordance with another aspect of the present invention, the hold means includes a solenoid for selectively holding the push button in the second position. The follower member is operatively connected with electrical contacts which supply electrical power to the solenoid such that movement of the follower member to the release position opens the electrical contacts removing power from the solenoid and allowing the biasing means to bias the push button member back to the first position.

In accordance with another aspect of the present invention, a timed switch is provided. A cam surface of a timing cam selectively engages the follower member to move the follower member into and out of the release position.

In accordance with another more limited aspect of the invention, an appliance control circuit is provided including a switch member as set forth above. The flow control device includes an electrical contact pair that is connected between a source of power and a timing motor. Moving the push button to the second position enables electrical power to be conducted to the timing motor and timing functions of the appliance commenced.

A primary advantage of the present invention is that it provides a manual latching switch which automatically resets at the end of a timed cycle.

Another advantage of the present invention is that it is more reliable and more cost efficient than a power relay or a microprocessor based control.

Yet another advantage of the present invention is that it provides an electromechanical switching circuit which enables a microwave oven or other appliances to shift automatically between high or low power or other operating modes.

Still further advantages of the present invention will become apparent to those of ordinary skill in the art upon reading and understanding the following detailed description of the preferred embodiments.

BRIEF DESCRIPTION OF THE DRAWINGS

The invention may take form in various parts and arrangements of parts. The drawings are only for purposes of illustrating preferred embodiments of the invention and are not to be construed as limiting it.

DETAILED DESCRIPTION OF THE PREFERRED EMBODIMENTS

Figure 1:
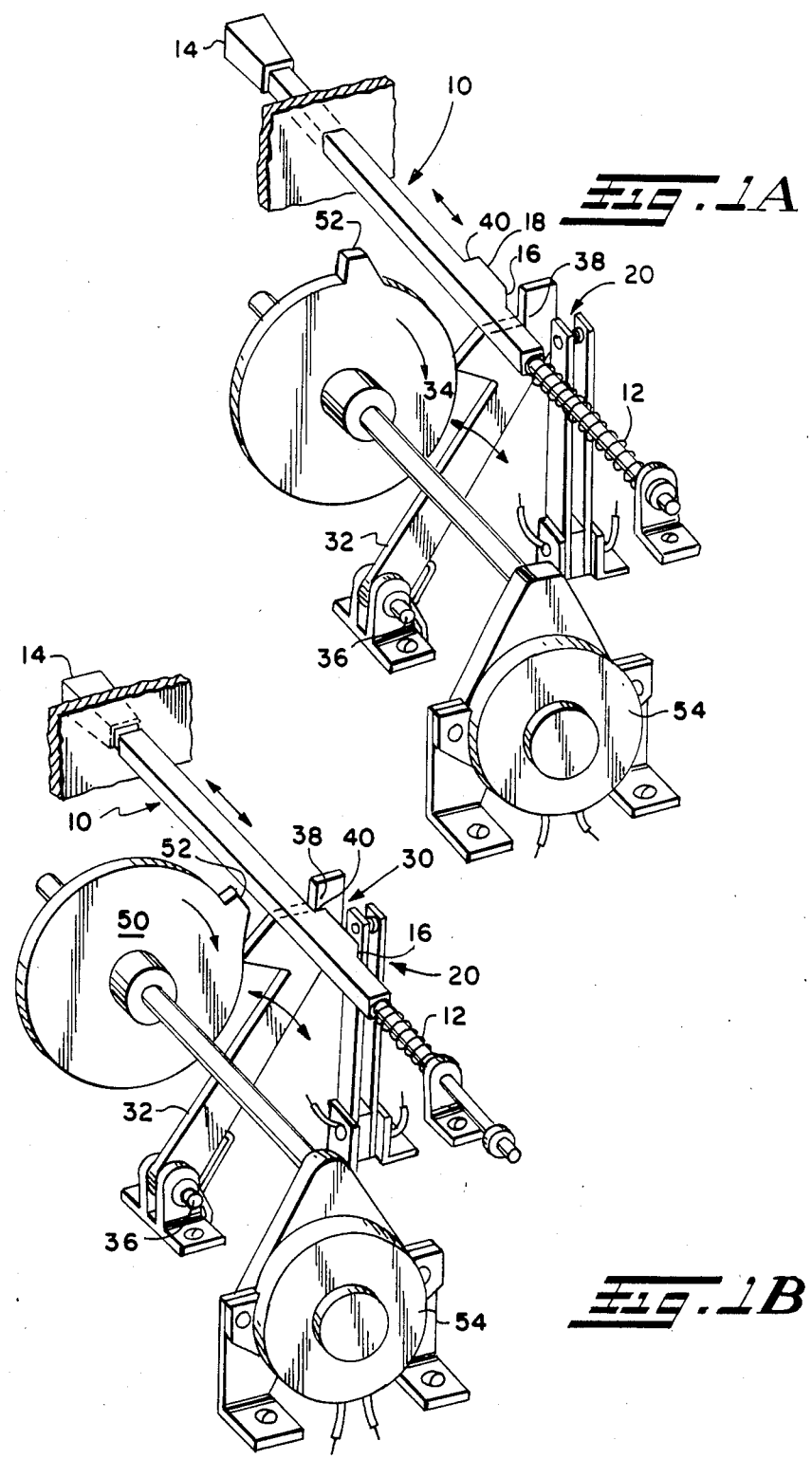
FIG. 1A is a perspective view of a switch in accordance with the present invention with electrical contacts in an open position.
FIG. 1B illustrates the switch of FIG. 1A with the electrical contacts in a closed position.

With reference to FIGS. 1A and B, a push button member 10 is mounted for selective longitudinal movement between a first position (FIG. 1A) and a second position (FIG. 1B). A biasing means 12, such as a coil spring, biases the push button member 10 toward the first position. Manual pressure on a free end or manual engagement end 14 or pressure applied through a mechanical linkage (not shown) selectively urges the push button member against the force of the biasing means to the second position. In the second position, an outward projecting flow control device engaging cam surface 16 and an engaging or holding surface 18 selectively cam and hold a flow control device 19 in an "on" or flow conducting position. In the preferred embodiment, the flow control device 19 includes a pair of leaf spring electrical contacts 20 which are urged into a touching or electrically conductive state in the second position and bias themselves to a separated or non-conductive state when the push button is in the first position. Optionally, the push button cam and engaging surfaces 16, 18 may urge normally closed electrical spring contacts to open. Other flow control devices such as a reed switch, a pneumatic or hydraulic valve, sliding electrical contacts, a capacitively or inductively controlled bistable device, or the like are also contemplated.

A hold means 30 selectively holds the push button member 10 in the second position. In the embodiment of FIGS. 1A and B, the hold means includes a follower member 32 which is mounted for movement transverse to the longitudinal axis of the push button member. The follower member defines a generally horizontal push button supporting surface 34 along which the push button member slides longitudinally. As the push button member moves from the first position to the second position, the cam surface 16 cams the follower member about a pivot 36 to a release position allowing the cam and engaging surfaces to move therepast. The follower member 32 and the push button member 10 include selectively engaging hold surfaces 38, 40 which interengage after the cam and engaging surfaces 16, 18 have been cammed past the follower member. The hold surfaces hold the push button member in the second position until the follower member is moved to a release position in which it is pivoted sufficiently to disengage the hold surfaces. Thereafter, the biasing means 12 applies a biasing force to return the push button member to its first position.

In the preferred embodiment, the follower member 32 engages the surface of a timing member 50 which moves the follower member to the release position at selected times or intervals. Preferrably, the timing member is a timing cam which includes at least one projecting or radially greater cam surface portion 52. The timing cam rotates in coordination with the operating cycle of an appliance in which the switch is installed. As the radially greater cam surface portion 52 engages the follower member 32, the follower member is moved from a hold position to the release position. In the illustrated embodiment, the timing cam 50 is operatively connected with a timing means 54, such as a synchronous timing motor or other mechanism which causes the timing cam 50 to rotate at one or more selected rates or in selected steps.

In one mode of use, the illustrated switch may replace a power relay in an electrical appliance. The various control switches and timing cams are set to select the duration of cook, wash, or dry cycles, the heat or temperature, the fill level, and the like. Upon closing the appliance door, a door actuated switch is closed. However, open pair of electrical spring contacts 20 prevent power from reaching the electrical controls. Upon depressing the manual engagement end 14 of the push button member 10, the cam and engaging surfaces 16, 18 close the electrical spring contact pair 20 providing power to the appliance. The timing cam 50 is angularly displaced in coordination with associated mechanical movements, or timing and cycle control signals for the appliance. At the end of the selected appliance cycle, the radially greater cam surface portion 52 moves into contact with the follower member 32 moving it to its release position. This terminates operation of the appliance until reset for the next cycle.

Figure 2:
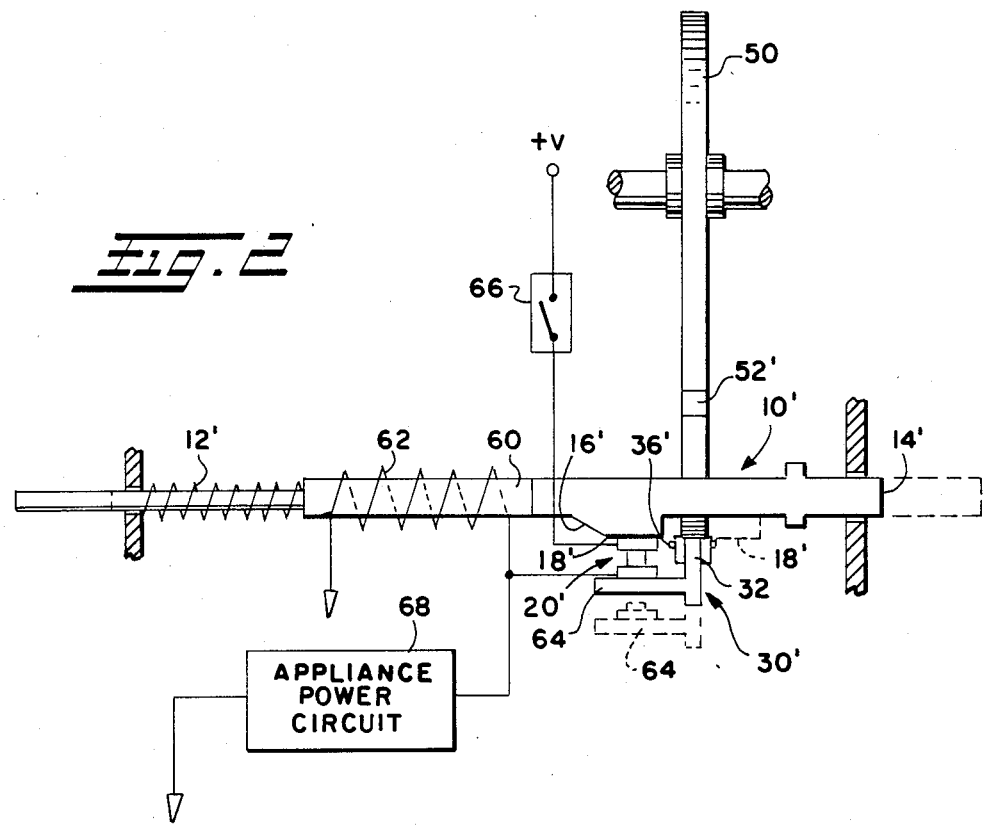
FIG. 2 is a top view of an alternate embodiment of the present invention in which a solenoid holds the switch in one of its states.

In the embodiment of FIG. 2, like elements with the embodiment of FIG. 1 are denoted with the same reference numerals but followed by a prime ('). A push button member 10' is selectively urged against a biasing means 12' by manual pressure on a free or outer end 14'. In the illustrated, second position, a cam surface 16' and spring contact engaging surface 18' have urged and are holding a pair of spring, electrical contacts 20' together in an electrically conductive relationship. When the push button member 10' is in the first position, the spring engaging surface 18' is displaced from the electrical spring contacts as shown in phantom allowing the electrical spring contacts to open.

A hold means 30' includes an iron or ferrous push button portion 60 and a surrounding solenoid coil 62. The solenoid coil is connected in series with the electrical spring contacts 20' to be energized when the push button member is in the second position. In this manner, once the push button member is manually urged to the second position, the solenoid coil holds the push button member against the force of biasing means 12' and maintains the electrical spring contacts 20' in a closed, conductive relationship.

A follower member 32' has an electrical contact engaging arm that is generally designated as a follower member arm 64 extending outward for biasing the electrical spring contacts together. A timing cam 50' having a greater radius cam surface portion 52' selectively engages the follower member 32' to urge it toward a release position. In the release position, the follower member arm 64 is moved outward allowing the electrical spring contacts to move apart, breaking the circuit to the solenoid coil 62, and releasing the push button member 10' to return to the first position. Optionally, a safety switch 66, such as a door open switch of the appliance, may be connected in series with the electrical spring contacts 20'. When the appliance door is opened or another safety related event occurs, the flow of electrical power to the solenoid coil 62 is terminated releasing the push button member.

An appliance power circuit 68 is also connected in series with the electrical spring contact pair 20' to receive electrical power therethrough. In this manner, power is only supplied to the electrical appliance when the push button member 10' is in its second position and the supply of power is terminated when the push button member is released and allowed to return to its first position.

Figure 3:
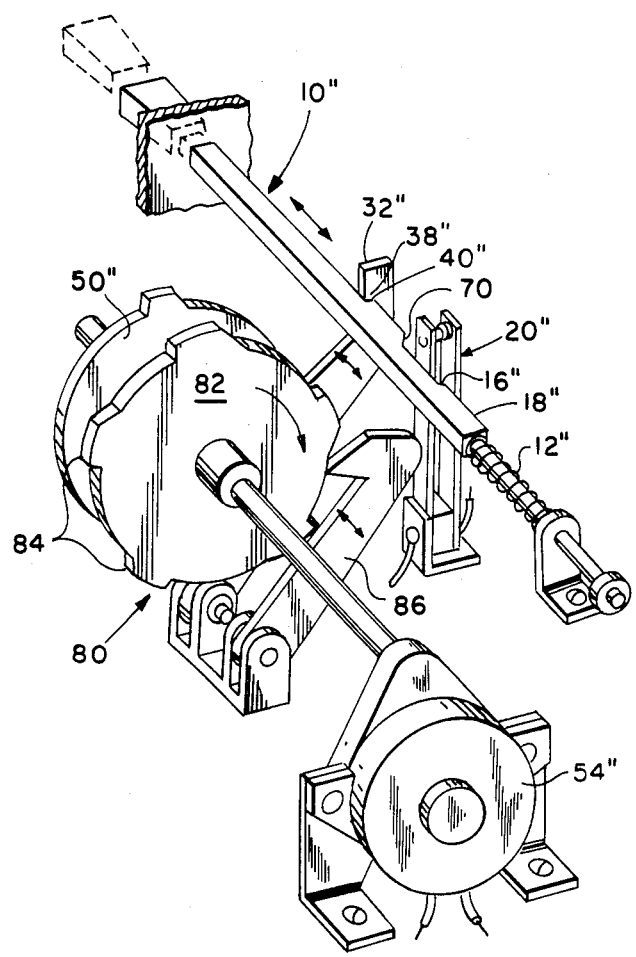
FIG. 3 is a perspective view of illustrating a timed switch in accordance with the present invention which has continuously "on" and intermittently "on" states; and, FIG. 4 is an exemplary circuit diagram for an electrical appliance incorporating the switches of FIGS. 1 and 3.

In the embodiment of FIG. 3, like elements with the embodiments of FIGS. 1 and 2 are denoted by the same reference numerals but followed by a double prime (").

A push button member 10" is selectively urged longitudinally against a biasing means 12" from a first position to the illustrated second position. As the push button member moves longitudinally toward the second position, a cam surface 70 cams a follower member 32" outward allowing hold surfaces 38", 40" to pass by each other. Once the hold surfaces have bypassed each other, the follower member 32" returns to its hold position such that the hold surfaces engage and hold the push button member 10" in the second position.

In the second position, a pair of electrical leaf spring contacts 20" biases themselves to an open, non-conducting position. An intermittent actuation means 80 selectively opens and closes the electrical spring contact pair 20". In particular, a second or intermittent actuation or cycle cam 82 having a plurality of radially greater cam surface portions 84 is mounted to be angularly displaced by a timing means 54". In one embodiment, the larger radius cam surface portions are of selectively increasing length to vary the duration or duty cycle with which the electrical spring contact pair is closed. Alternately, the larger radius cam surface portions may engage the electrical spring contacts directly. A transfer member 86 transfers the closing and opening momentum between larger radius cam surface portions and the electrical spring contacts. Optionally, other duty cycle control cams, such as an eccentric cam, may selectively open and close the electrical spring contacts.

The timing means 54" also rotates a timing cam 50". When a greater radius timing cam surface portion 52" engages the follower member 32", the hold surfaces 38", 40" are moved out of engagement. The coil spring 12" urges the push button member 10" to return to its first position. As the push button member moves toward its first position, a cam surface 16" and a switch contact engaging surface 18" cam and hold the electrical spring contacts 20" to a closed, continuously conductive position or state.

Figure 4:
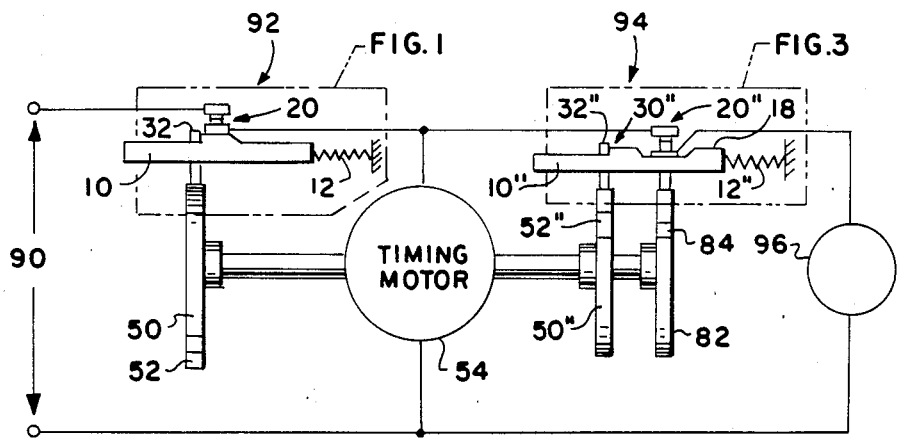

With reference to FIG. 4, switches of the embodiments illustrated in FIGS. 1 and 3 are illustrated in conjunction with the control circuit for an electrical appliance. Electrical power is applied across input leads 90. A first switch 92 generally of the construction illustrated in FIG. 1 is connected between the input leads 90 and the timing means 54. A second switch 94 of the construction illustrated in FIG. 3 is connected between the first switch 92 and the motive power circuit of an appliance, such as the magnetron 96 of a microwave oven.

In operation, the relative angular position of timing cam 50" and cycle cam 82 are selectively adjusted to select the appropriate duration of a defrost cycle and a subsequent cook cycle. The second push button member 10" of the second switch 94 is manually urged to its second position. Once the remaining controlled parameters are set, the first push button 10 of the first switch 92 is moved to its second position to commence operation of the microwave oven.

As the timing means 54 rotates defrost cycle cam 82, the radially greater cam surface portions 84 intermittently close the second electrical spring contacts 20" causing pulses of electrical power to be supplied to the magnetron 96. By constructing each radially greater cam surface portion 84 to be progressively shorter in arcuate length, the duration of each pulse cycle progressively decreases. In this manner, the amount of microwave radiation supplied to the food during the defrost cycle progressively decreases.

As the radially greater cam surface portion 52" of the second timing cam 50" moves into engagement with the second follower member 32", the second push button member 10" is released and electrical contacts 20" closed. Electrical power is now supplied to the magnetron continuously, automatically commencing the cook cycle. The cook cycle continues until the radially greater cam surface portion 52 of the first timing cam 50 rotates into engagement with the first follower member 32. The first follower member 32 releases the first push button member 10 allowing the first electrical spring contact pair 20 to open terminating a supply of power to the timing motor and the magnetron. In this manner, an electromechanical timing circuit is provided which automatically restores to the cook mode. This permits a defrost or intermittent power cycle of a selectable duration to be followed by a cook or continuous power cycle of a selected duration without manually resetting to the cook mode. The cook mode may follow the defrost cycle either automatically or await a manual signal to commense the cook mode.

The invention has been described with reference to preferred embodiments. Obviously, modifications and alterations will occur to others upon reading and understanding the preceeding detailed description. For example, the push button member may be pivotably mounted rather than being mounted for longitudinally sliding movement. Other hold means may be provided for holding the push button member in one of its two positions. Other appliance cycle sensitive structures may replace the timing cams for releasing the push button members. Further, various intermediate elements may be disposed in a linkage arrangement between interacting components of the disclosed embodiments. It is intended that the invention be construed as including all such alterations and modifications in so far as they come within the scope of the appended claims or the equivalents thereof.

Having thus described preferred embodiments, the invention is now claimed to be:

1. A switch comprising:
   a push button member which is movably mounted for movement at least between first and second positions for selectively moving a control device at least between first and second states;
   a biasing means for biasing the push button member toward the first position, the biasing means being operatively connected with the push button member;
   a hold means for selectively holding the push button member in the second position, the hold means being operatively connected with the push button member;
   a follower member mounted for movement at least in and out of a release position, in the release position the follower member selectively causing the hold means to release the push button member from being held in the second position;
   a timing means for intermittently moving the follower member to the release position to release the push button member after a selected duration; and,
   said hold means including selectively engaging hold surfaces on the push button member and the follower member, movement of the follower member to the release position moving the hold surfaces out of engagement.

2. The switch as set forth in claim 1 wherein the push button member includes a cam surface portion for selectively camming the hold surfaces of the push button member and the follower member past each other as the push button member is moved from the first to the second position.

3. The switch as set forth in claim 2 wherein the push button member is mounted to slide longitudinally between the first and second positions.

4. A switch comprising:
a push button member which is longitudinally movable between a first position and a second position, the push button member having a hold surface and an integral cam surface for selectively camming a first electrical leaf spring contact into engagement with a second leaf spring contact in one of the first and second positions and resiliency of the first electrical leaf spring contact biasing the first electrical leaf spring contact out of contact with the second electrical leaf spring contact in the other of the first and second positions;
a biasing means for biasing the push button member toward the first position;
a pivotally mounted follower member which is biased to pivot into engagement with the push button member hold surface for holding the push button member in the second position; and,
a timing cam having a radially greater cam surface portion for camming the follower member to pivot out of engagement with the hold surface such that the biasing means returns the push button member to the first position.

5. A switch comprising:
a push button member which is movably mounted for movement at least between first and second positions for selectively moving a pair of electrical spring contacts between conducting and non-conducting relationships;
a biasing means for biasing the push button member toward the first position, the biasing means being operatively connected with the push button member;
a solenoid for selectively holding the push button member in the second position, the solenoid being operatively connected with the push button member and being operatively connected with the electrical spring contacts to receive electrical power therethrough;
a follower member mounted for movement at least in and out of a release position, in the release position the follower member selectively causing the electrical spring contacts to move between the conducting and non-conducting relationships to cause the solenoid to release the push button member from being held in the second position; and,
a timing means for intermittently moving the follower member to the release position to release the push button member after a selected duration.

6. The switch as set forth in claim 5 wherein:
the push button member includes a cam surface for camming a first of the electrical spring contacts toward a second electrical spring contact in the second position and wherein the follower member includes a portion which selectively cams the second electrical spring contact toward the first electrical spring contact and allows the second electrical spring contact to move away from the first when the follower member is in its release position.

7. The switch as set forth in claim 5 wherein the push button member includes a means for moving the electrical spring contacts into a closed, conductive relationship when the push button is in the second position.

8. The switch as set forth in claim 8 wherein the follower member selectively urges at least one of the electrical spring contacts toward a conducting relationship and permits the electrical contacts to move to the non-conducting relationship when the follower member is moved to the release position.

9. The switch as set forth in claim 7 wherein the push button member includes a cam which cams a first of the electrical spring contacts toward a second electrical spring contact and wherein the follower member includes a portion which selectively cams the second electrical spring contact toward the first and allows the second electrical spring contact to move away from the first when the follower member is in its release position.

10. A switch comprising:
a first push button member which is movably mounted for movement at least between first and second positions for selectively moving a first pair of electrical spring contacts between a conducting relationship and a non-conducting relationship;
a biasing means for biasing the first push button member toward the first position, the biasing means being operatively connected with the first push button member;
a hold means for selectively holding the first push button member in the second position, the hold means being operatively connected with the first push button member;
a follower member mounted for movement at least in and out of a release position, in the release position the follower member selectively causing the hold means to release the first push button member from being held in the second position;
a timing means connected in series with the electrical spring contacts and a source of electrical power such that moving the first push button member to the second position starts the flow of electrical power to the timing means;
the timing means after a selected duration selectively moves the follower member to the release position releasing the first push button member and terminating the flow of electrical power to the timing means;
a second pair of electrical spring contacts connected in series between the first pair of electrical contacts and a motive power means for an appliance;
a second push button member for selectively moving the second pair of electrical spring contacts between contacting and non-contacting relationships; and,
a means associated with the second electrical spring contact pair for selectively causing electrical power to be selectively supplied therethrough in a selected one of continuous and intermittent modes, whereby "cook" and "defrost" cycles are provided.

11. A switch comprising:
a push button member which is movably mounted for movement at least between first and second positions for selectively moving a control device at least between first and second states;
a biasing means for biasing the push button member toward the first position, the biasing means being operatively connected with the push button member;

a hold means for selectively holding the push button member in the second position, the hold means being operatively connected with the push button member;

a follower member mounted for movement at least in and out of a release position, in the release position the follower member selectively causing the hold means to relase the push button member from being held in the second position;

a first timing cam for selectively engaging the follower member for selectively moving the follower member to the release position; and, a second cam for selectively causing the flow control device to assume the "on" and "off" states alternately.

* * * * *